Patented July 18, 1933

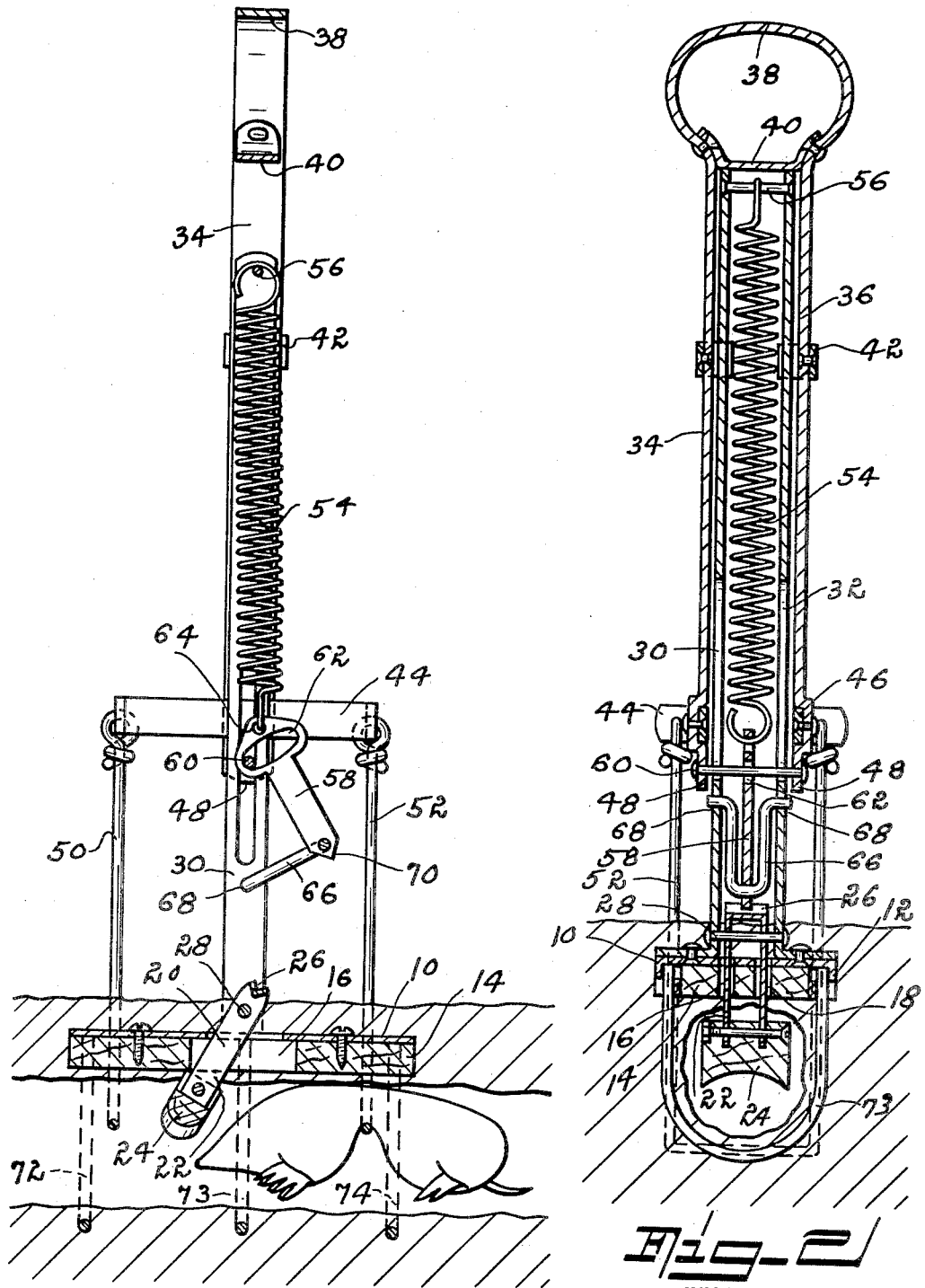

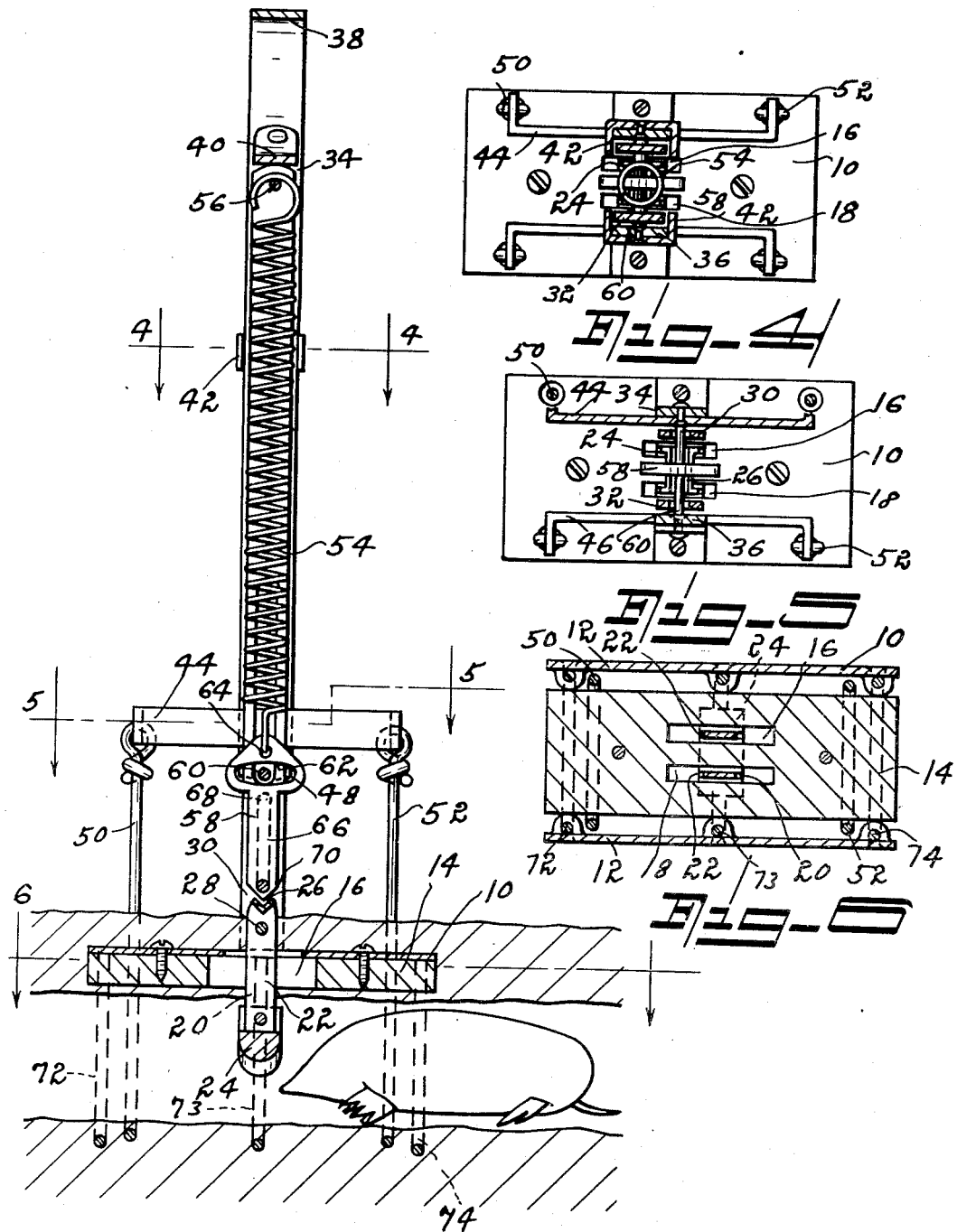
July 18, 1933.　　　　F. ALVAU　　　　1,918,582
ANIMAL TRAP
Filed April 19, 1932　　2 Sheets-Sheet 2

1,918,582

UNITED STATES PATENT OFFICE

FRANK ALVAU, OF REDONDO, WASHINGTON

ANIMAL TRAP

Application filed April 19, 1932. Serial No. 606,188.

My invention relates to devices for the trapping of burrowing animals and may be more specifically referred to as an improvement in animal traps. There are many animals of the burrowing type, which cause a great deal of damage in gardens, lawns, and other places where fertile ground is under cultivation, and while many devices have been already produced, designed to catch these animals, for certain reasons none of them have been very successful. The efficiency of any trap depends upon its being so constructed as to adapt itself to the habits of the animal it is designed to capture.

Chief among the burrowing animals is the common ground mole, and I have shown my device as it would be constructed primarily for use against this rodent. It will be apparent, it is believed, however, that by suitably proportioning my device it would be equally usuable against the various other burrowing animals, and also animals which live in furrows, such as rabbits, prairie dogs, gophers, rats and the like.

My present invention is so designed that when it is put in places there is nothing to excite the suspicion of the animal. Great care has been exercised in seeing that no metal parts are where they will be contacted by the animal, and further my trap is so arranged that it will exclude all light from the runway, a matter which usually betrays the trap's presence.

Having briefly outlined the principles of my trap, the objects of my present invention are, namely, First, the production of a trap which is characterized by its extreme simplicity of construction.

Second, the production of a mole trap that can be set without exciting the suspicion of the animal.

Third, a trap provided with means which make it difficult for an animal to avoid the trap by digging around the same.

Other and more specific objects will be apparent from the following description taken in connection with the accompanying drawings, wherein;

Figure 1 is a side elevation of my device, certain parts of which are shown in section, and showing it as engaging a mole.

Figure 2 is an end elevation of the same, most parts being shown in sections to better illustrate the construction, the trap itself, however, is shown in its set position.

Figure 3 is a side elevation similar to Figure 1 except that the trap is shown in its set position.

Figures 4, 5 and 6 are plan section views taken along the lines 4—4 and 5—5, and 6—6, respectively, of Figure 3.

Referring to the drawings, throughout which like reference characters indicate like parts, 10 designates the main frame work or base of my trap. This I normally prefer to form of sheet metal to the end that it will have maximum strength for anchoring the various members to it and is at the same time capable of formation by dies from flat steel stock. Disposed within this space, which has downwardly extending side portions, as is indicated at 12, I provide a face member or plate 14. The purpose of this plate is to provide safety means which will prevent the animal in question coming in contact with any metal. I normally prefer to form the plate 14 of wood, or other suitable compositions. It might take the form of molded rubber, or some of the cheaper compositions, or even bakelite, but should most preferably, be material not easily effected by temperature changes, so that if an animal should rest against it they will not be alarmed.

Centrally disposed, with respect to plate 14, are two slotted openings as 16 and 18. Mounted to swing within these slots is a trigger member 20, this member I prefer to form with two downwardly extending leg portions as 22 and to secure at the bottom or lower end of the leg members a trigger block 24, which should normally be of the same material that plate 14 is made from, preferably wood or composition. The upper end of the trigger member I prefer to form as an open V, indicated at 26. The trigger I prefer to pivotally support as on pivot 28, to the side frame members 30 and 32. These members extend downwardly, and are provided with feet so as to suitably engage the main frame 10. This construction will most clearly be shown, possibly in Figure 2.

Disposed, in my present construction, preferably outside of side frame 30 and 32 is a sliding frame, which is composed of the two side members as 34 and 36, respectively, which as is illustrated are formed of a single bar which is bent back on itself, so as to form the handle portion 38, and for sake of rigidity of construction, I prefer to join the two members at this point with the tie member 40. At, at least one point, near the upper end of the slide frame, I prefer to provide an encircling tie as at 42, which limits the movement of the slide with respect to the slide frame, so as to make it move as a unit along a definite axis. Near the lower limit of the slide frame I provide preferably two loop support members as 44 and 46, and have found it most convenient to form the slide frame members 34 and 36 around the support members after the showing of Figure 2. This provides a lower bearing as at 48 to provide additional rigidity to the two members as they slide one on the other.

Secured to the support members 44 and 46, at their outer ends are the animal engaging loops 50 and 52. These are arranged to go through opening in the frame member 10, but to go outside of, preferably, the plate member 14. Each of these loops form a U-shaped animal engaging member.

It is now necessary to provide actuating means for these loops. This, in the present instance, is provided by the tension spring 54, which is anchored at one end as at 56, to the side frame members and which is anchored at its opposite end to the toggle member 58, which in turn is suitably connected to these side frames.

The connection to the slide frame is provided by passing a bolt or rivet 60 through the lower end of members 34 and 36, and an elongated hole or opening 62 is provided at one end of the toggle member so that while the spring tension is applied to rivet 60, toggle 58 is still capable of considerable movement across rivet 60. The spring 54, is attached at 64, which is above this slotted opening. At the lower end of toggle member 58 I provide the U-shaped toggle member 66. This engages toggle 58 so that the same is free to revolve thereon, and its opposite ends are secured within the side frame members 30 and 32 as shown at 68.

The toggle member 58 and the toggle U 66 must be so proportioned and so pivoted that when the spring is in its extended position, as is shown in Figures 2 and 3, the lower end of toggle 58, which I prefer to form as V-shaped at 70, will come to rest slightly about the V-shaped opening 26 after the showing of Figure 3. The preferred arrangement is to have a small amount of clearance between the trigger 26 and the V of the toggle member. Suitably secured to base 10, I provide a plurality of U-shaped animal directing members as 72, 73 and 74. These should be of somewhat greater extent than the loop members 50 and 52.

Method of operation

In operating my device for trapping moles, for instance, it is necessary to find a mole runway, this is a simple task as the mole in digging, moves the dirt upwardly, and thus marks his runway very clearly. It is possible to set my trap by merely moving away a portion of the soil above the runway and forcing my trap down until the U-shaped members 72, 73 and 74, and the loops 50 and 52 encircle the runway. When this condition is maintained the wooden portion of the trigger member will be disposed within the runway where any mole moving through the runway must bump into the same, and thus spring the trap. This procedure is only practical for the man of considerable experience. The more common procedure is to open up the runway by removing all the soil clear down until the runway is completely exposed. The trap can then be quite carefully placed, and as soon as the trap has been set in its balanced position, the whole device should be carefully covered with soil to about the depth as is indicated in Figures 1, 2, and 3. It being very essential that all light be excluded from the runway and that no metal parts be exposed as any metal which is exposed will tend to frighten the moles. In this connection it is very essential to place the trap with its longitudinal axis in coincidence with the longitudinal axis of the runway when the trap is so placed, the animals directing loop as at 72, 73 and 74 will be so positioned that in case the mole becomes suspicious and attempts to dig around the trap, they will soon uncover one of the three loops, and in their panic, trip the trap.

In order to set my trap, it is first necessary to firmly support the frame 10. This may be by resting the edge of frame 10 on some solid article or by resting the guiding members 72, 73 and 74 on some firm base, and then pressing downwardly on handle 38. This causes the slide frame to move downwardly, carrying with it the animal engaging loops 50 and 52. When the downwardly limit of movement has been reached the toggle 58 will then be in a vertical position with the U-shaped toggle member 66, in the position indicated in Figure 2. When this condition is reached by careful setting of the toggle member 58, so that it will be centrally disposed and have the rivet 60 centrally disposed with reference to the axis of the toggle 58, a state of equilibrium will exist. This is shown in Figure 2 and particularly in Figure 3. Now, it is believed apparent that, all that is required to upset this equilibrium and spring the trap, is a small movement of the trigger 20.

It is desired to call attention to the fact that with my trigger as arranged the trap can be sprung by rodents passing the trigger from either direction. Further, as my trap secures the mole by raising a loop upwardly from the bottom of the runway the fur is not damaged in any way, and is thus made available for sale.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

Having thus fully described my invention, what I claim as new and desire to secure by Letters Patent is:

1. The combination in a victim closed trap having a slotted base block, a rigid upright main frame, and a release trigger pivoted in the frame, of an exterior slide frame and guiding means therefor on the main frame, a pair of arms rigid with the slide frame, a pair of looped-jaws suspended from said arms, a spring anchored to the main frame, a crank journaled in the main frame, a slotted crank arm suspended from the spring, a supporting pin on the slide frame for the slotted arm, and co-acting means on the crank arm and trigger for setting the trap.

2. The combination in a victim-closed trap having a base block, a main frame and a cross pin rigid therewith, and a trigger pivoted in the main frame and suspended through openings in the block, of a slotted slide frame co-acting with the pin, a spring suspended from the slide frame, a slotted crank arm mounted on said pin and connected with the spring, a crank mounted in the main frame and journaled on said arm, and co-acting means on the trigger and crank arm for setting the trap.

3. The combination in a victim-closed trap having a slotted base block and a main frame, of a trigger pivoted in the frame and suspended through the slotted block, a spring-actuated slide frame, a U-shaped crank journaled in the main frame above the trigger, a crank-arm journaled on the crank and suspended from the slide frame, and co-acting means on said crank arm and trigger for setting the trap.

4. The combination in a victim-closed trap having a slotted base block and main frame, of a trigger pivoted in the frame and suspended through the slotted block, a V-shaped head on the trigger, a spring actuated slide frame, a U-shaped crank journaled in the main frame above the trigger, and a crank arm journaled on the crank and suspended from the slide frame, said crank arm having a wedge shaped end for engagement with the V-shaped head of the trigger.

5. The combination in a victim-closed trap having a slotted base block and a main frame having a cross pin rigid therewith, of a trigger pivoted in the main frame and suspended through the slotted block, a V-shaped head on the trigger, a spring, and a slide frame actuated by the spring, a U-shaped crank journaled on the main frame above the trigger, a crank arm having a slot through which said pin passes, said arm journaled on the crank and a pivot connection between said arm and the spring of the slide frame, and a wedge shaped end on the crank arm for engagement with the V-shaped head of the trigger.

FRANK ALVAU.